Aug. 22, 1961   H. A. PAIGE   2,997,117
SUPPORT MECHANISM FOR TRACTOR TOOL BARS
Filed May 2, 1958
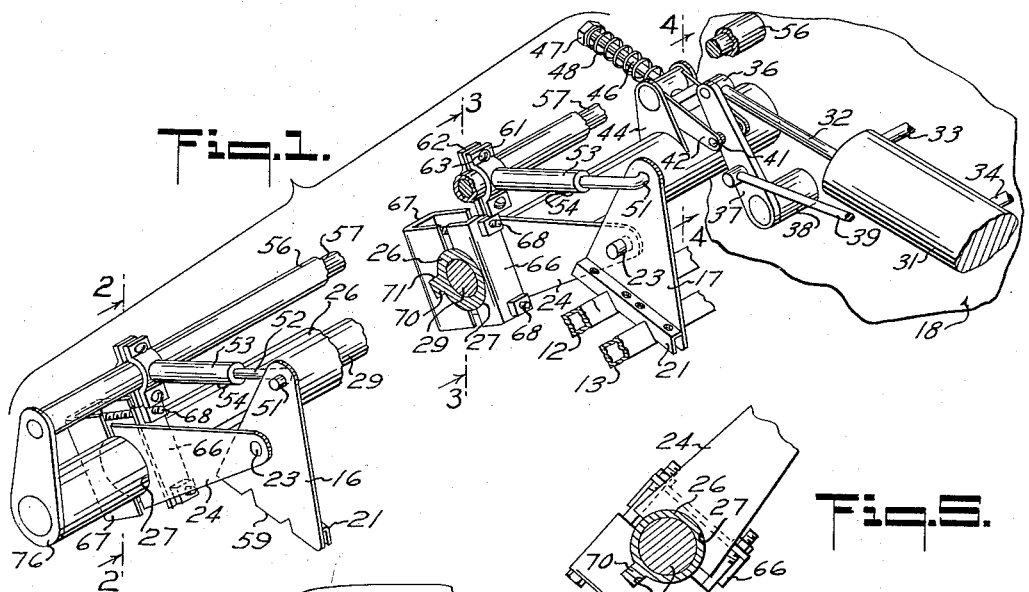
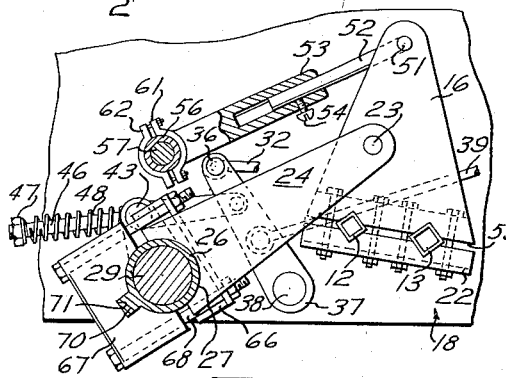
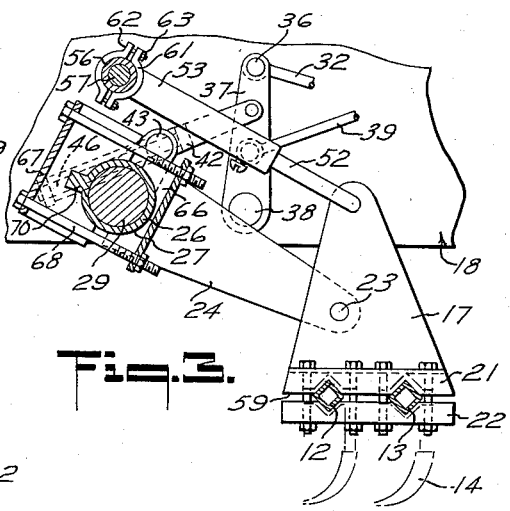
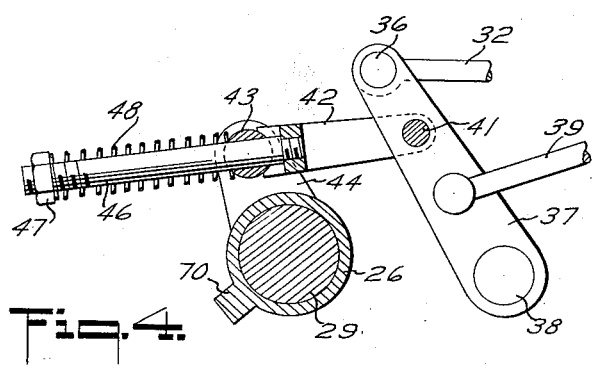
INVENTOR
HOWARD A. PAIGE
BY
Gardner & Zimmerman
ATTORNEYS

United States Patent Office 2,997,117
Patented Aug. 22, 1961

2,997,117
SUPPORT MECHANISM FOR TRACTOR
TOOL BARS
Howard A. Paige, 56 Porter Drive, Watsonville, Calif.
Filed May 2, 1958, Ser. No. 732,553
1 Claim. (Cl. 172—484)

This invention relates to apparatus for moving and supporting a tractor tool bar in selected positions of elevation, and constitutes an improvement over my prior Patent No. 2,793,577.

An object of the present invention is to provide an adjusting and supporting mechanism for a tractor tool bar on which the ground engaging tools are mounted, which is arranged to have substantially all of the parts thereof located in such a position as to cause no interference or damage to growing plants when the tools are in a raised inoperative position or when the ground engaging tools are in a lowermost operative position.

Another object of the invention is to provide apparatus of the character described in which the angular disposition of the tool bars and consequently of the ground engaging tools may be readily selectively varied.

A further object of the invention is to provide support mechanism of the type hereinabove described in which the tool bar supporting mechanism may be readily adjusted laterally of the longitudinal axis of the tractor.

A further object of the invention is to provide apparatus of the type described in which the tractor bar is capable of fine angular adjustment between a limited number of degrees, and is likewise capable of more extensive independent angular adjustment through a larger number of degrees.

A still further object of the invention is to provide support mechanism as hereinabove explained in which a novel actuating arrangement is utilized for effecting the raising and lowering of the tool bar and which likewise incorporates a novel resilient means associated therewith for preventing damage to the parts such as when the ground engaging tool strikes an unyielding object.

A still further object of the invention is to provide apparatus of the character described in which the supporting mechanism is so arranged as to render the tool bar and the tools carried thereby readily visible at all times by the operator whereby the latter may readily determine the proper position of the bar and tools during his cultivating or other operations on the soil.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claim.

Referring to said drawing:

FIGURE 1 is a perspective view of the support mechanism of the present invention, illustrating the position of the parts when the tractor tool bar is in a raised inoperative position.

FIGURE 2 is a transverse cross-sectional view taken substantially in the plane indicated by line 2—2 of FIGURE 1.

FIGURE 3 is another transverse cross-sectional view taken substantially in the plane indicated by line 3—3 of FIGURE 1 but modified to show the position of the parts when the tool bar is in its lowered operative position.

FIGURE 4 is a transverse cross-sectional view on an enlarged scale taken substantially in the plane indicated by line 4—4 of FIGURE 1.

FIGURE 5 is a portional transverse cross-sectional view similar to FIGURE 2, but illustrating an angular adjustment of the bar support members.

In conventional tractor mounted cultivators, there is usually provided one or more horizontal tractor tool bars indicated at 12 and 13 respectively extending laterally of the longitudinal axis of the tractor, the cultivators or other ground engaging tools 14 being suitably attached to such bars. In connection with such equipment, the tool bars as well as the tools carried thereby are arranged to be selectively raised and lowered so that they may be moved from an upper inoperative position to an operative lower position wherein the tools 14 engage the soil to some predetermined depth. While various types of mechanism for effecting vertical movement of the bars have heretofore been adopted, it has been found that such prior art devices possess certain features of disadvantage which renders their use either from an operational or from a maintenance standpoint less than satisfactory. In accordance with the teachings of the present invention, the tool bars 12 and 13 are supported by mechanism positioned substantially above the same and in such a manner as to permit ready raising and lowering of the bars with a minimum of difficulty and in such a manner as to permit the operator to have a clear unobstructed view of the tools during his cultivating operation.

As here illustrated, each of the tool bars is suitably supported and carried by a pair of brackets 16 and 17 disposed with the planes thereof in generally vertical parallel relationship to the longitudinal axis of the tractor 18. Each of the brackets may simply comprise a relatively flat plate of structural material having the bottom edge thereof notched at one or more locations for reception of the upper half of the conventionally square tool bar. To secure the bars to the bracket, any suitable clamping mechanism may be utilized such as by providing an upper clamp member 21 secured to one lower surface of the bracket with a cooperating clamp member 22 disposed subjacent the same and bolted or otherwise releasably secured to the upper clamp 21 for clamping the bars therebetween.

The brackets 16 and 17 are each primarily supported on a transverse horizontal pin 23 which extends at right angles from an arm 24 and is pivotally mounted to a medial portion of the bracket by providing an enlarged aperture for reception of the pin. It will be appreciated that as the arms 24 are selectively raised and lowered, a resulting raising and lowering of the brackets and the tool bars carried thereby will be effected. Means are provided for effecting a raising and lowering of the end of arm 24 to which the pin is attached by operatively securing the other end thereof to a transversely extending horizontal sleeve 26. For the present, it might be explained that the inner end of arm 24 is of arcuate configuration as indicated at 27 so as to engage a substantial portion of the circumferential extent of sleeve 26. However, as will be presently explained, additional securing means are provided for insuring proper connection and simultaneous movement between the sleeve and arm. Sleeve 26 is journalled for rotation upon a transversely extending shaft 29 which is fixed to a portion of the tractor in any suitable manner.

In order to effect rotary movement of the sleeve 26 on shaft 29 actuating mechanism is provided which is best illustrated in FIGURES 1 and 4 of the drawing. As there shown, a hydraulic cylinder 31 is provided which has one end thereof (not shown) pivotally attached to a portion of the tractor, and which includes an axially extending piston rod 32 extending from the free end thereof. The cylinder 31 adjacent the ends thereof is provided with a pair of fluid inlet and outlet ports 33 and 34 through which fluid under pressure may be selectively caused to pass, resulting in either an extension or retraction of the rod 32. As a preferred manner in which such cylinder actuation may be effected, reference is directed to my copending application, Serial No. 732,501, filed May 2, 1958, and entitled "Hydraulic Depth Control Mechanism for Tractor Tool Bars and the Like." Cylinder rod 32 is pivotally connected as indicated at 36 to the upper end of a link 37 whose lower end is pivoted as shown at 38 to a member suitably secured to the tractor 18. In this manner, actuation of the cylinder rod 32 will result in either clockwise or counterclockwise movement of link 37 as viewed in FIGURE 4 of the drawing. The link 37 may be also provided with a connecting rod 39 which is adapted to be attached to the hydraulic control mechanism for a purpose discussed in said copending application.

Pivotally secured to a medial portion of link 37 such as by a pin 41 is a yoke 42 whose free end is arcuately shaped to engage a short transversely extending shaft 43 which is carried on the upper end of a pair of spaced lugs 44, the latter being fixed to sleeve 26 such as by welding or the like. Yoke 42 is further provided with a longitudinally extending rod 46 which passes through an aperture provided in shaft 43 and at the end of such rod is a stop member 47. Interposed between the shaft and stop member and encompassing the rod 46 is a compression spring 48 whose function will be hereinafter explained.

From the foregoing description it will be seen that if rod 32 is retracted, the link 37 will be rotated in a clockwise direction as viewed in FIGURE 4, resulting in the link 42 being likewise moved to the right, and through its connection to sleeve 26 effecting a like clockwise rotation of such sleeve about the fixed shaft 29. This will of course result in a downward movement of arms 24 and a resulting lowering of the brackets 16 and 17, tool bars 13 and 14 and the tools 14 carried thereby into the position illustrated in FIGURE 3 of the drawing. Conversely, by extending the cylinder rod 32 to the positions illustrated in FIGURES 1, 2 and 4 of the drawing, the link 37 will be rotated in a counterclockwise direction, the sleeve 26 will be likewise rotated, the arms 24 raised and the tool bars likewise raised to the inoperative position illustrated in FIGURE 2 of the drawing.

The compression spring 48 as above explained, is utilized to prevent damage to the parts when the bars are in their lower or operative position and the tools should engage an unyielding object such as a large rock or the like. In such case, the spring would be compressed, and the movable parts of the apparatus, including the sleeve 26 could be rotated to a sufficient extent to cause the bars to be raised until the obstruction is cleared, the spring then operating to return the parts to their normal lowered position. Thus, there is little danger of any of the rigidly attached parts being broken or otherwise damaged upon engagement of the tools with an unyielding object.

Returning now to the tool support brackets 16 and 17, it will be appreciated that if the pins 23 constituted the sole support for the brackets, the latter would be free to pivot and rock about the pivot and thereby render the angular disposition of the tools impossible of determination. Accordingly, means are provided for engaging an upper portion of the brackets so as to retain the same and consequently the bar supported thereby in a preselected angular disposition. As here illustrated, the upper end of each bracket is apertured to receive an angular extension 51 of a rod 52. Rod 52 is slidably mounted in a cylinder 53 having an axial bore, and the rod is normally restrained against movement therein by means of a set screw 54 or other suitable locking means. The other end of the cylinder 53 is operatively connected to a transversely extending sleeve 56 disposed above and in parallel relation to the sleeve 26 previously described. Sleeve 56 is journalled on a transverse shaft 57 which, like the shaft 29, is fixed to the tractor in any suitable manner. Thus, since sleeve 56 is free to rotate, the rod 52 will merely serve as a guide for the upper portion of the bar supporting brackets and depending on the amount of extension of the rod the lower edge 59 of the bracket against which the tool bars are positioned may be angularly determined. By observing FIGURE 2 of the drawing it will be clear that if the set screw 54 is loosened and the rod 52 extended, the bracket will be generally rotated in a clockwise direction about its pivotal support 23 and thereby change the angle of the surface 59 relative to the ground and likewise place one of the bars in a more elevated position relative to the other of the bars. Conversely, by moving the rod 52 further into the cylinder bore, a counterclockwise rotation of the bracket is effected resulting in a more horizontal disposition of the bracket in its raised position and a subsequent lowering of one of the bars relative to the other when the arm 24 is swung downwardly.

Further angular adjustment may be readily accomplished and at the same time permit transverse movement of the rod 52 along its supporting sleeve 56 by providing one end of the cylinder 53 with a clamp 61 of generally arcuate configuration adapted to engage a circumferential portion of the sleeve. A corresponding clamp 62 may be positioned on the other side of the sleeve and secured to the clamp 61 by means of bolts 63 or the like. Obviously, loosening of the clamping bolts will permit a relative radial adjustment of the cylinder 53 relative to sleeve 56 and subsequent angular adjustment to the bar supporting bracket. However, it will be likewise obvious that movement of the clamp axially along the sleeve 56 would be impossible unless the arms 24 could likewise be so moved along their supporting sleeve 26.

In order to provide for the aforementioned lateral displacement of the arms 24 along the sleeve 26 it will be recalled that the inner end of such arm is provided with an arcuate portion 27 which engages a peripheral surface of the sleeve. The arm, adjacent such surface is further provided with an angular clamp generally indicated at 66 which is likewise provided with an arcuate portion adapted to engage a correspondingly shaped portion of the sleeve. On a diametrically opposed side of the sleeve a U-shaped clamp 67 is utilized and by means of longitudinally extending bolts 68 the two clamps 66 and 67 may be secured on the sleeve and consequently likewise secure the arms 24 thereto. It will be appreciated that loosening of the bolts 68 will permit the clamping members and consequently the arms 24 to be moved axially along the sleeve. In this manner, the arms 24 as well as the rods 52 which are disposed substantially immediately above the arms may be readily moved along their respective sleeves so as to position the bar brackets 16 and 17 in any desired transverse location relative to the sides of the tractor 18.

To provide for further angular adjustment, sleeve 26 is provided with a key 70 extending axially along the sleeve, and as will be observed, the key is not disposed in a horizontal position. Clamping member 67 is provided with a slot 71 for engaging said key and it will be noted that the clamping members are secured together by the bolts 68 which are disposed above and below the sleeve 26. In this manner, a small angular adjustment may be made to the position of arms 24 by loosening, for example, the upper bolt 68 and taking in on the lower bolt 68. This will result in a slight rotation of the arms and the clamping member 66 about the sleeve.

Since adjustment of the bolts 68 will result only in a relatively limited amount of radial adjustment of arm 24, where a larger adjustment is desired it is possible to accomplish the same by completely removing the clamping member 68 and inverting the same. This will produce a large variation in the angular disposition of arm 24 due to the fact that the key 70 and the keyway or slot 71 are always disposed at a slight angle so that reversal or inversion of the clamping members will produce the aforesaid angular adjustment to the arms.

This feature is best illustrated in FIGURES 2 and 5 of the drawing where the sleeve 26 is shown in a stationary position but the clamping member 67 has been inverted causing the arm 24 to be substantially raised or pivoted in a counterclockwise direction as viewed in said figures.

With the foregoing description in mind, it will be readily appreciated that the rods 29 and 57 which are secured to the tractor may be disposed on either or both sides of the tractor, or if desired may extend completely subjacent the same and on both sides of the tractor. Usually, at the end of the rod remote from their connection to the tractor a suitable hanger 76 may be utilized to prevent axial displacement of the sleeves 26 and 56 on their respective shafts. Also, it will be understood that usually, a pair of brackets such as that indicated at 16 and 17 will be utilized on opposite sides of the cultivator tools which are attached to the tool bars. Any desired number of brackets and/or tools may be secured to the bars depending upon the particular soil operation being conducted. In any event, it will be appreciated that simple extension or retraction of the cylinder rod 32 will result in a proper lowering or raising of the tractor bars, and the particular angular disposition of the bars relative to each other and to the ground may be simply and readily predetermined and controlled.

What is claimed is:

Apparatus of the character described comprising a pair of parallel vertically spaced and horizontally extending shafts, a first sleeve journalled for rotation on the lower of said shafts and a second sleeve journalled for rotation about the uppermost shaft, a radially extending arm operatively connected to said first sleeve, means engaging said arm and said first sleeve for selectively varying the radial and axial positioning of said arm on said first sleeve, said first sleeve being provided with an axially extending key, a pair of cooperating clamp elements releasably secured to diametrically opposite portions of said sleeve, one of said clamps being secured to said arm and the other of said clamps having a keyway therein slidably engaging said key, said key being angularly offset from a diameter of said first sleeve parallel to the longitudinal axis of said arm whereby said other clamping element may be inverted for varying the angular disposition of said first mentioned clamping element and the arm carried thereby relative to said first sleeve, a tool bar supporting member pivotally connected intermediate the upper and lower edges thereof to the end of said arm, a radially extending member operatively connected to said second sleeve in selected positions of radial and axial displacement for rotation therewith and overlying said arm in parallel spaced relationship thereto, means pivotally connecting an upper portion of said supporting member to the distal end portion of said latter member, and means operatively connected to said first sleeve for rotating said first sleeve about said shaft whereby said tool bar supporting bracket may be rotated between an upper inoperative position and a lower operative position.

References Cited in the file of this patent

UNITED STATES PATENTS

| | | |
|---|---|---|
| 1,797,476 | McCain et al. | Mar. 24, 1931 |
| 1,827,123 | Trively | Oct. 13, 1931 |
| 1,946,402 | Johnson | Feb. 6, 1934 |
| 2,063,051 | Ray | Dec. 8, 1936 |
| 2,131,872 | Galpin | Oct. 4, 1938 |
| 2,171,830 | Hayes | Sept. 5, 1939 |
| 2,444,321 | Woolridge | June 29, 1948 |
| 2,449,159 | Brown | Sept. 14, 1948 |
| 2,747,484 | Fraga | May 29, 1956 |